Patented Aug. 19, 1952

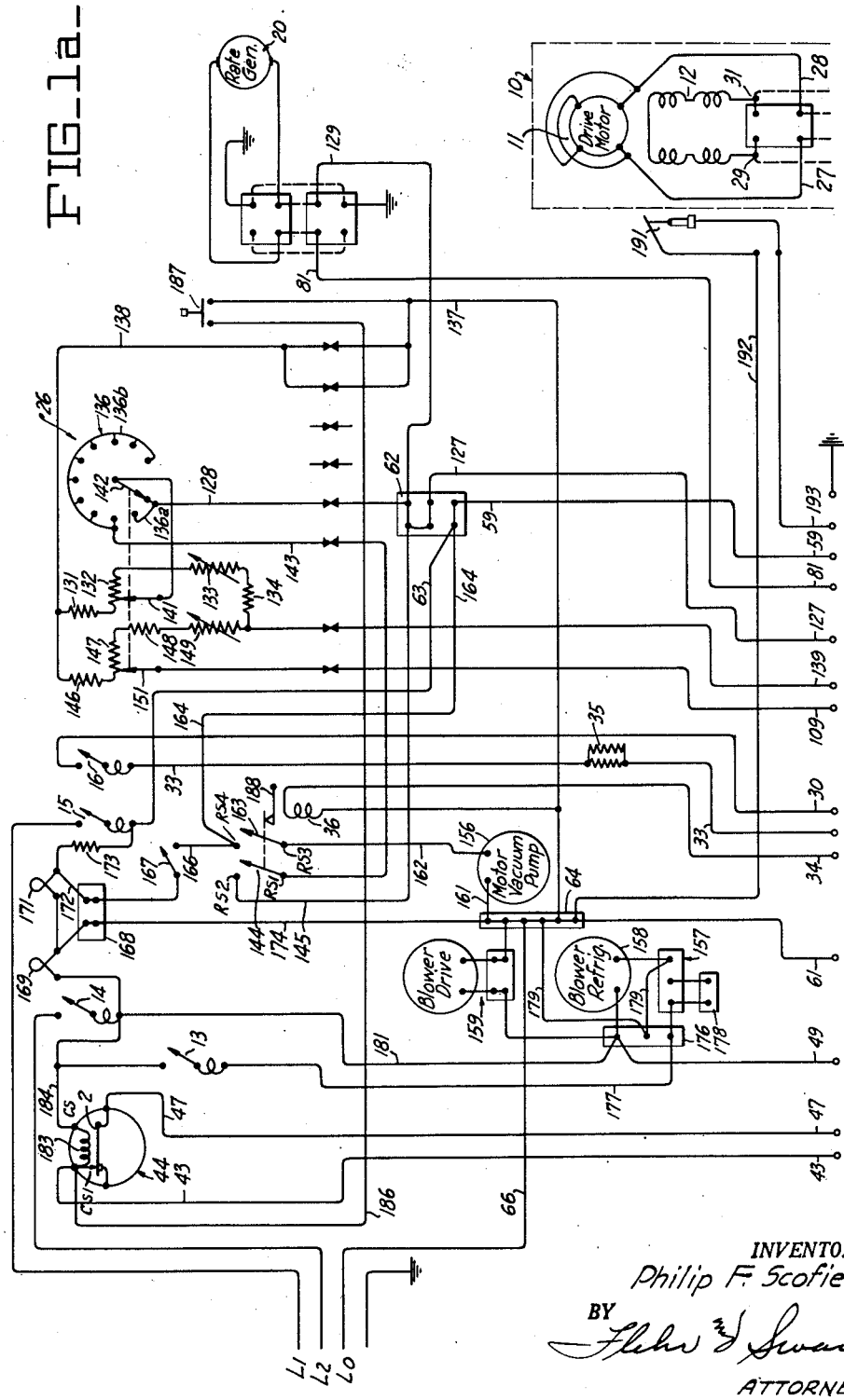

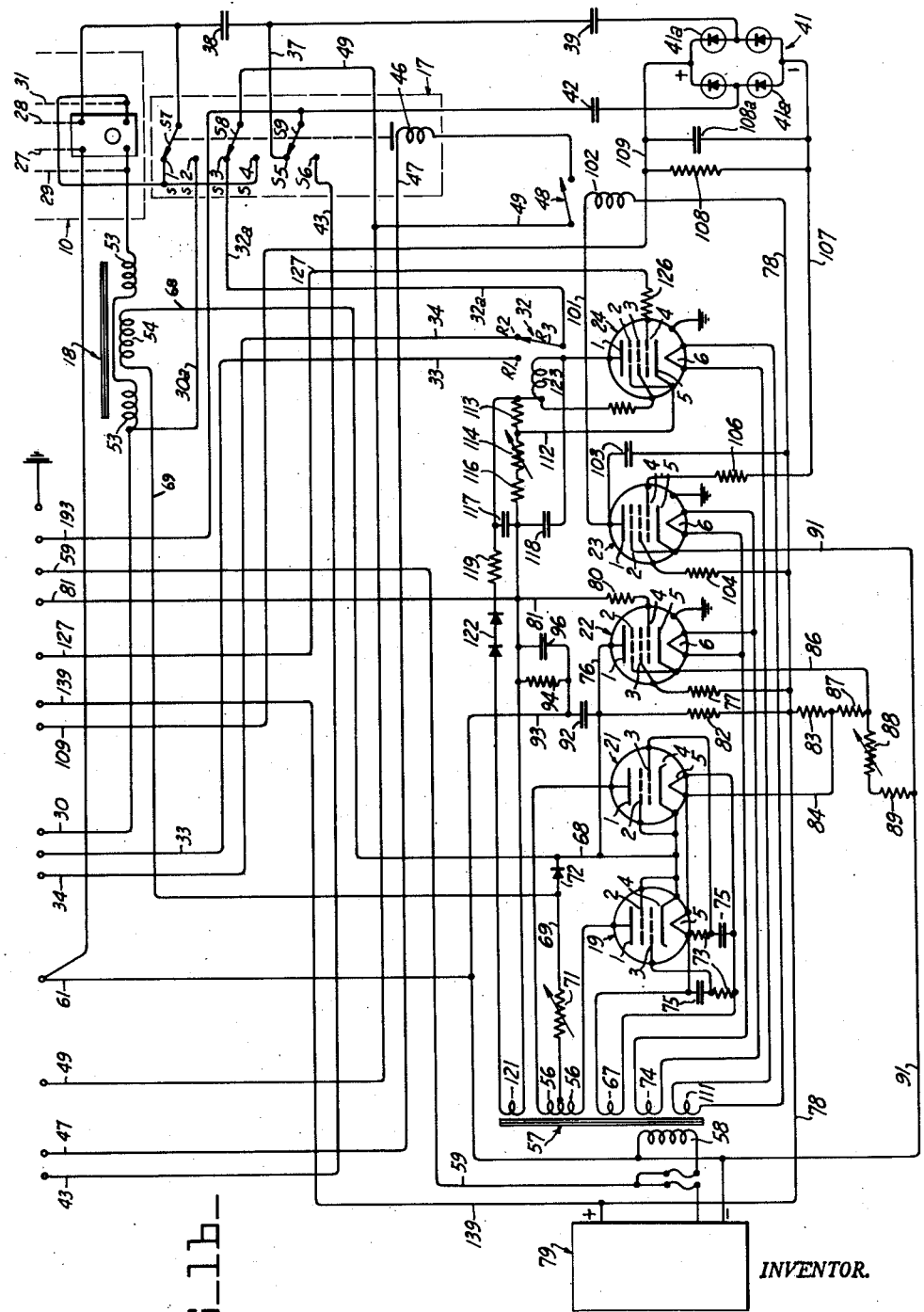

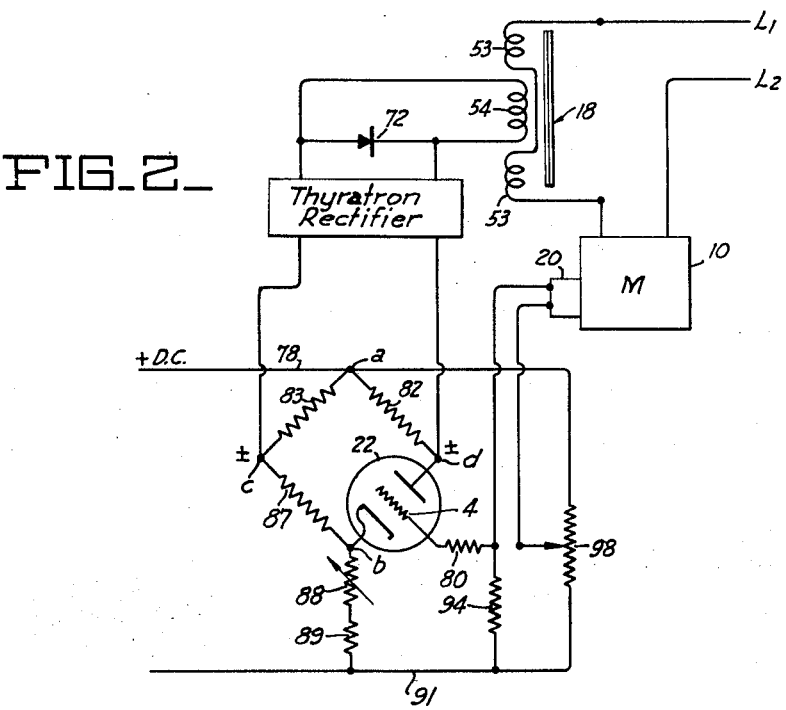
FIG_2_

2,607,909

UNITED STATES PATENT OFFICE 2,607,909

MOTOR CONTROL EQUIPMENT

Philip F. Scofield, Atherton, Calif., assignor to Specialized Instruments Corporation, Belmont, Calif., a corporation of California Application May 22, 1950, Serial No. 163,532

7 Claims. (Cl. 318—347)

This invention relates generally to electrical equipment for controlling the operation of electrical motors. In many industrial applications it is desirable to control the functioning of an electric motor whereby the motor will automatically comply with certain predetermined performance requirements. By way of example, reference can be made to motors suitable for driving high speed centrifuge rotors. It is desirable to control the rate with which the rotor is accelerated, to maintain the speed of rotation constant after the rotor has been accelerated to the speed desired, and to control stopping the motor after a run has been completed. In addition to these requirements, it is desirable to provide automatic safety controls such as automatic means to prevent conditions of overspeed. For such centrifuge service automatic control equipment such as has been used in the past is not satisfactory for many reasons. Particularly, such equipment has not been suited for the building of a small compact control unit capable of controlling the speed of low horsepower alternating current motors. In addition, the speed control has not been as sensitive and accurate as desired, and the apparatus has not been sufficiently flexible with respect to adjusting the rate of acceleration. A further disadvantage is that they have not provided adequate control over stopping the motor after a run. Adequate safety features have also been lacking, as for example, adequate control to prevent dangerous overspeed in the event of failure of certain operating parts.

In general it is an object of the present invention to provide electrical control equipment which can be used to advantage with small alternating current motors, and which can be made into a relatively compact control unit.

A further object of the invention is to provide electrical motor control equipment which will overcome the disadvantages of prior equipment of this general character, as outlined above, and which in particular will afford more adequate and flexible control over maintenance of constant speed conditions during a run.

Another object of the invention is to provide control equipment of the above character having novel means for controlling stopping of a motor after the completion of a run and which in particular will automatically apply and remove motor braking means.

Another object of the invention is to provide apparatus of the above character having many inherent safety features, including means to prevent overspeed in the event of failure of the rate generator.

Additional objects of the invention will appear from the following description in which the preferred embodiments have been set forth in detail in conjunction with the accompanying drawing.

Referring to the drawing:

Figures 1a and 1b taken together form a circuit diagram illustrating equipment incorporating the present invention.

Figure 2 is a modified and simplified circuit diagram, illustrating certain parts of my apparatus.

In general, the present invention makes use of a saturable reactor for controlling supply of alternating current to the driving motor. A rectifier of the thyratron type is employed for supplying unidirectional current to the saturable reactor, whereby variations in the impedance of the reactor serve to control the rate of acceleration of the motor and maintenance of the motor at a constant speed during a run. Controlling voltages are applied to the control grids of the thyratron rectifier to secure the motor performance desired, having reference particularly to speed of acceleration and constant speed during a run.

Referring to the circuit diagram of Figure 1, I have shown an alternating current motor 10 having an armature 11 and field winding 12. Alternating current is supplied to the circuit by way of supply lines $L_1$, $L_2$ and $L_0$. The alternating current voltage between $L_0$ and either $L_1$ or $L_2$, can be 120 volts. Current supply to various parts of the apparatus from the lines just mentioned is controlled by the overload circuit breakers 13, 14, 15 and 16. The motor is also under the control of a reversing switch 17 and a variable reactor 18 of the saturable type. The armature of the motor 10 is mechanically connected to the rate generator 20, in order to secure a control voltage proportionate to the speed of operation of the motor. The rate generator in turn is electrically associated with parts including the thyratron rectifier tubes 19 and 21, and the amplifier tube 22. Additional amplifier tubes 23 and 24 are provided which are employed respectively in connection with a backspeed electromotive force overspeed control and the motor brake cutoff. A manually operated speed control unit 26 is also associated with the tubes 19, 21 and 22, and is utilized in conjunction with manual setting of the speed desired.

The above is a general designation of some of the more important parts of the equipment. A more detailed description is as follows: Wires 27 and 28 lead from the armature terminals of the motor 10, and wires 29 and 31 lead from the field winding. Wire 29 connects to one terminal of the saturable reactor 18, and the other terminal of this reactor is connected by wire 30 to the circuit breaker 16. The wires just mentioned connect to the current supply through the multiple contact reversing switch 17. This reversing switch includes the contacts S1, S2, S3, S4, S5 and S6, and the switch arms S7, S8 and S9. Contact S1 directly connects by wire 31 to the motor field. It is also directly connected to contact S4. Contact S2 is connected by wire 30a to one terminal of the saturable reactor 18. Contact S3 is connected by wire 32a with the contact arm R3 of the relay switch 32. Contact R1 of switch 32 is connected by wire 33 to one side of the brake overload switch 16, and contact R2 of the same is connected by wire 34 with the winding 36 of an interlock which will be presently explained in greater detail. Resistors 35 are inserted in series with wire 33 and serve to control current during motor braking. Contact S4 of the motor reversing switch 17 is connected with the contact 1 and wire 31, and contact 5 is connected by wire 37 to a point between the two direct current blocking capacitors 38 and 39. Capacitor 38 is connected between contact arm S7 and contact S5, and capacitor 39 connects from contact S5 to a terminal of the special rectifier 41 to be presently explained in greater detail. Contact S7 also connects with the wire 28 leading from the motor armature. Contact arm S9 is connected by another capacitor 42 to the same rectifier 41. Contact S6 of the reversing switch is connected by wire 43 to the contact arm CS1 of the clock controlled switch 44. As will be presently explained the clock controlled switch 44 serves to determine the time period of a motor run. All of the contact arms S7, S8 and S9 are connected for conjoint operation by energizing the winding 46. When the contact arms of switch 17 are in the positions illustrated in the drawing, it is in motor reversing (i. e. braking) position. However when the contact arms are shifted whereby arms S7, S8 and S9 make connection respectively with contacts S2, S3 and S4, current is supplied to the motor for acceleration and normal operation. Current supplied to the winding 46 serves to control the position of the contact arms of switch 17. One side of this winding is connected by conductor 47 to the contact CS2 of the clock control switch 44. The other terminal of winding 46 is connected through relay switch 48 and wire 49 with the circuit breaker 14. One side of the saturable reactor 18 is connected through wire 30 and breaker 16 with the wire 33 and from thence to the contact R1 of the relay switch 32.

The saturable reactor 18 comprises the windings 53, which are connected in series between wires 29 and 30, and which are therefore connected in the alternating current exciting circuit for the motor. The reactor also includes the winding 54 which is adapted to be supplied with current to more or less saturate the magnetic core of the reactor and thereby vary the reactance in the motor circuit. As the reactance is increased, the power supply to the motor is correspondingly decreased, thus controlling the motor speed.

Controlled unidirectional pulses are supplied to the winding 54 from the two thyratron tubes 19 and 21. Each of these tubes has been shown including the customary plate 1, screen 2, control grid 3, cathode 4, and cathode heater 5. The plates 1 are connected to the terminals of the series connected windings 56, which are secondary windings of the power supply transformer 57. The primary transformer winding 58 is supplied with alternating current from the alternating current supply lines, through the wires 59 and 61. Wire 59 connects through the terminal block 62 and wire 63 to one side of the circuit breaker switch 15. Wire 61 connects through terminal block 64 and wire 66 to the center power supply conductor L₀. The transformer secondary 67 serves to supply current to the heaters 5 of the thyratrons 19 and 21.

The rectified output from thyratrons 19 and 21 is taken from the wire 68 which connects with the two cathodes 4, and the wire 69 which connects through variable resistor 71 with the midpoint between the transformer windings 56. As will be presently explained, adjustment of the resistor 71 serves to adjust the rate of acceleration of the motor. Connected between wires 68 and 69 there is a rectifier cell 72 which can be of the selenium type, and which serves to modify the wave form of the direct current pulses. It may be pointed out that without the rectifier 72, the wave form of the pulses can be represented by sharp peaks spaced apart along the zero voltage axis. Selenium rectifier 72 functions according to what is commonly termed a free wheeling device, and modifies the wave form to reduce the amplitude of the peaks and to extend them along the zero voltage axis. Wires 68 and 69 connect directly with the winding 54 of the saturable reactor 18, and it is the current thus supplied to the winding 54 which determines the effective reactance of the saturable reactor in the motor circuit.

The screens 2 of the thyratrons 19 and 21 are directly connected to the cathodes 4. Control grids 3 are connected to phase shifting means including the resistors 73 and condensers 75.

The thyratron tubes 19 and 21 are controlled by voltages applied from the plate of the tube 22 to the control grids 3. This tube can be a pentode amplifier, having the plate 1, screen 2, grids 3 and 4, cathode 5, and cathode heater 6. The cathode heater can be supplied with current from the secondary winding 74 of the transformer 57. The plate of the tube 22 is connected by wire 76 to the cathode of tubes 19 and 21. The screen 2 is directly connected to the cathode 5. The grid 3 is connected through the resistor 77 to the wire 78, and this wire connects to the positive lead from a rectifier 79. This rectifier is constructed to provide a constant direct current voltage and is supplied with alternating current from the wires 59 and 61. Thus a predetermined bias is maintained upon the grid 3. Control grid 4 is connected through resistor 80 to a wire 81, which in turn connects with the positive side of the rate generator 20. Thus the voltage applied to the control grid 4 is dependent upon the speed with which the rate generator is driven by the motor 10. A resistor 82 connects between conductors 76 and the positive conductor 78, and conductor 78 is connected to the heater circuit of the tubes 19 and 21 through resistor 83 and wire 84. The cathode 4 of tube 22 is connected by wire 86 to the midpoint between the resistors 87 and 88, the latter being variable. Resistor 87 connects wire 86 with the wire 84 and the heater circuit of tubes 19 and 21. Variable resistor 88 is connected by fixed resistor 89 to a wire 91, which connects with the negative side of the rectifier 79. Condenser 92 and wire 93 connect from conductor 76 to the conductor 61. As previously mentioned, the latter wire connects with the center power supply line L₀. A bleed resistor 94 is shown connected from conductor 93 to the wire 81, and this resistor can be shunted by the condenser 96.

The arrangement of resistors described above is diagrammatically illustrated in Figure 2. Resistors 82, 83, 87 and tube 22 form in effect, branches of a bridge. The point $a$ on this bridge is connected to the direct current wire 78, and point $b$ is connected to the neutral potential wire 91 through the resistors 88 and 89. Thus a substantially constant voltage is applied across the bridge points $a$ and $b$, depending upon the setting of resistor 88. The voltage between the points $c$ and $d$ of the bridge is dependent upon the impedance of the tube 22, which is here shown as a simple triode. This impedance depends upon the voltage applied to the grid 4. As this voltage becomes more negative, the plate to cathode impedance of the tube increases. It will be evident that with such a bridge, there can be a wide range of voltages between the points $c$ and $d$, depending upon the control of the tube 22. These points are connected to the thyratron rectifier as diagrammatically illustrated in Figure 2.

Figure 2 illustrates the grid 4 of the tube 22 connected to one side of the rate generator motor, and the other side of this motor is shown connected to the variable tap of potentiometer 98. As will be presently explained in the actual circuit diagram of Figure 1, a plurality of resistors take the place of the potentiometer 98. The terminals of the potentiometer are connected to the conductors 78 and 91.

It may be pointed out that according to the arrangement schematically illustrated in Figure 2, the speed of the motor 10 is automatically regulated to be of constant value, and this value is dependent upon the tap setting of the potentiometer 98. Assuming a given speed of operation of the motor 10, rate generator 20 is driven at a predetermined speed and delivers a corresponding voltage. Depending upon the setting of the tap for a potentiometer 98, a predetermined voltage difference exists between this tap and the conductor 91. This voltage difference is in opposition to the voltage applied by the rate generator 20 so that a predetermined differential voltage is applied to the grid 4 of the tube 22. Assuming a state of balance between current supplied to the reactor 18, and the electronic control means, the differential voltage applied to the grid of tube 22 will cause a voltage difference between points $c$ and $d$ of the bridge which is applied to the thyratron rectifier whereby the rectified output of the same applied to the winding 54, provides the desired reactance for the balanced condition. Should the motor tend to increase in speed, the grid of tube 22 tends to be driven more negative, with the result that the voltage difference between points $c$ and $d$ is altered to produce a compensating correction through the thyratron rectifier and the variable reactor 18. The same applies when the motor speed tends to drop. When the motor 10 is first started in operation it will be evident that the rate generator voltage will be at a minimum, and therefore under such conditions, the voltage difference between points $c$ and $d$ is such that the output of the thyratron rectifier applied to winding 54 is of maximum value to thereby cause a minimum alternating current reactance in the motor power supply circuit.

It will be noted that in Figure 1, the voltage between points $c$ and $d$ is applied to the cathodes 4 and to the circuit for the heaters 5. Resistor 73 and condensers 75 form in effect a phase shifting arrangement, whereby the alternating current components applied to the grids 3 are 90° out of phase with the alternating current component applied to the plates. When the controlling voltage is applied as just described, a D. C. controlling voltage is applied to the control grids 3, thus providing a graduated control, with the rectified output being supplied by lines 68 and 69 to the saturable reactor.

To proceed with the description of Figure 1, the tube 23 serves as a part of a back E. M. F. motor overspeed control. This tube can likewise be a pentode like tube 22. The heater 6 is shown connected to the winding 74, which also supplies current to the heater of tube 22. The plate 1 of tube 23 is connected by wire 101 to the winding 102 of the relay switch 48. The other side of this winding connects to wire 78, which leads from the positive side of the rectifier 79. A condenser 103 also connects from the plate of this tube to the wire 78, or in other words, it is connected across the winding 102. The screen 2 of tube 23 is directly connected to the cathode 5, and the grid 3 is connected to wire 78 through resistor 104. The cathode of tube 23 is connected to the neutral wire 91. Grid 4 of the tube 23 is connected through resistor 106 to the wire 107, which leads to the negative side of the rectifier 41. As previously explained, the input of this rectifier is connected through condensers 39 and 42 with the motor circuit, whereby back electromotive force is applied through these condensers to the rectifier. The rectifier 41 can be of conventional type consisting of four rectifier units 41a connected for full wave rectification. The output is smoothed out by the use of resistor 108 and condenser 108a. The positive side of the rectifier output is connected by wire 109 to one of the taps of the speed control means which will be presently described.

Under conditions of overspeed, not properly handled by the regular speed control means, back E. M. F. supplied to the rectifier 41 causes a substantial rectified output which drives the grid of tube 23 negative, thus increasing the plate to cathode impedance of this tube to a point where insufficient plate current flows for holding the contacts of relay switch 48 closed. The opening of these contacts opens the circuit to the winding 46 of the main motor switch, thus causing this switch to move automatically to reverse or stop position.

As previously mentioned at the end of a run the motor starting switch 17 is in effect placed in reverse position to effect rapid magnetic braking. In many applications, as for example, where the motor is driving a centrifuge rotor, it is not desirable to continue braking to the point of complete stoppage. Thus means has been provided for removing the braking when the motor speed has dropped below a given speed of say 5,000 R. P. M. The tube 24 is a part of this brake cutoff means. Like the tubes 22 and 23, it can be a pentode, and the cathode heater 6 can be supplied with current from the transformer secondary 111. The screen 2 of this tube is similarly directly connected to the cathode 5, and the cathode is connected by conductor 112 to a simple filter circuit which includes the fixed and variable resistors 113 and 114, fixed resistor 116, condenser 117, condenser 118 and resistor 119. This circuit is connected to the transformer winding 121 through the rectifier 122. The winding 123 of the relay switch 32 has its one terminal connected to the plate of tube 24, and its other terminal connected to the filter circuit just mentioned.

The control grid 4 for the tube 24 is connected through resistor 126, wire 127, connector block 62 and wire 128, with the speed control means 26, as will be presently explained in greater detail.

Wire 129 also connects wire 127 with the positive terminal of the rate generator 20. When the rate generator is in operation during the making of a normal run, the voltage on the control grid 4 of the tube 24 is maintained at such a value that the plate to cathode impedance is relatively low and sufficient current flows through the winding 123 to maintain relay 32 closed, that is, with contact arm R3 making connection with contact 1. At the end of a run, and after the speed of the motor has dropped down to a predetermined value, the voltage upon the grid 4 is such that the plate to cathode impedance de-energizes the winding 123, to thereby permit contact arm R3 to connect with contact R2. This serves to energize the winding 46 of the motor switch 11, whereby this switch is returned to normal rather than motor braking position.

Previous reference has been made to the manually adjusted speed control means 26. This means includes the resistors 131, 132, 133, 134, together with the tapped resistor 136. Neutral voltage wire 66 connects through the connector strip 64 with wire 137, which in turn connects to the wire 138 leading to the control means 26. The positive side of the rectifier 79 is connected by wire 139 to the control means 26. Resistors 131, 132, 133 and 134 connect in series between the wires 138 and 139. The tapped resistor 136 comprises two sections of 136a and 136b, which are engaged by the contact arm 142. Wire 128 which connects through wire 129 with the rate generator, makes connection with one end of the section 136a. Resistor 132 is in the form of a potentiometer, and its movable contact 141 is directly connected to the contact arm 142 of the stepped resistor 136. Wire 143 connects with one end of the resistor section 136b, and leads to the contact arm RS1 of a switch 144. The contact RS2 of this switch is connected by wire 145 to the connector strip 62 and to wires 127 and 128. It will be evident that the arrangement just described forms in effect a voltage divider which is the electrical equivalent of the potentiometer 98 of Figure 2. Assuming that the contact arm 142 is on one of the taps of section 136a, then the tap 141 of potentiometer 132 is connected through resistor section 136a to wire 128 and one side of the rate generator.

For higher speeds of operation, it is necessary to move contact arm 142 to one of the contacts of resistor section 136b. This serves, in effect, to include the switch 144 in series with the adjustable resistor 136, whereby it is necessary for switch 144 to be closed before completing the connection between wires 128 and 145. Assuming, however, that the switch 144 is closed, then one can proceed to set the resistor 136, and also the contact of 141, in accordance with the speed desired.

The control means 26 preferably includes additional resistors used in connection with the overspeed safety control. Thus I provide resistors 146, 147, 148 and 149, which are connected in series between the wires 138 and 139. Resistor 147 is in the form of a potentiometer and resistor 149 is variable. The contact 151 of the potentiometer 147 is connected to the wire 109, which as previously mentioned, extends to the positive side of the rectifier 41. The resistors just described likewise form a voltage divider to which the voltage developed by the rectifier 41 is applied. Depending upon the setting of contact 151, the voltage applied through wire 107 leading from the negative side of the rectifier 41 to the control grid of the tube 23, is controlled accordingly. This setting can be such that in the event of an abnormal condition such as causes the motor to exceed the speed for which the control means 26 is set, the back electromotive force is such that its rectified component from rectifier 41 drives the control grid of the tube 23 negative to thereby de-energize winding 102 of relay switch 48, and thus open the energizing circuit for the winding 46 of the main motor switch.

Assuming application of the invention to centrifuge apparatus, it is desirable to include a number of auxiliary devices in the complete operating system. Thus, it is desirable to provide a motor driven vacuum pump 156, refrigerator 157, air blowing means 158 for the refrigerator, and a blower 159 for the speed multiplying drive between the electrical motor 10 and the centrifuge rotor. One side of the motor for the vacuum pump 156 can be connected by wire 161 to the center power supply conductor Lo, and the other side can be connected by wire 162 to the contact RS3 of the switch 163. The other contact RS4 of this switch is connected by wire 164 to the connector strip 62, where it makes connection with wire 59. Contact RS3 is also connected by wire 166 and switch 167 to a connector block 168, which is associated with the two pilot lights 169 and 171. Wire 172 leading from the block 168 connects to one side of the circuit breaker 15, in series with the resistor 173. Wire 174 leads from the connector block 168, and connects through strip 64 to the center current supply line Lo. One side of the pilot lamp 169 connects with wire 174, and the other side connects to the circuit breaker 14. Note that the two pilot lamps are connected in series between circuit breaker 14 and resistor 173.

The refrigerator 157 and the two blowers 158 and 159 can be connected as follows: One side of the refrigerator is connected through connector strip 176 and wire 177 to one side of the circuit breaker 13. Note that this breaker is, in effect, in series with the breaker 14. The other side of the refrigerator is connected in series with the temperature regulating means 178, and is connected by wire 179 with the center current supply conductor Lo through the strip 64. The refrigerator blower 158 has its one side connected to wire 179 and the center current supply conductor Lo and its other side connected through strip 176 and wire 181 to the circuit breaker 14. The blower 159 has its one side connected to the wire 181, and its other side connected to the center current supply conductor Lo through the connector strip 64.

The clock control switch 44 is diagrammatically illustrated as including an energizing winding 183. One side of this winding is connected by wire 184 to the circuit breakers 13 and 14, and the other side is connected to contact CS1. In addition to the connection between contact CS1 and wire 43, this contact is connected by wire 186 to the button type starting switch 187. The other contact CS2 of this switch connects through wire 137 with the center current supply conductor L₀. When the switch 187 is temporarily closed, current is supplied to the winding 183 of the clock control switch 44, and this serves to close the contacts CS1 and CS2 whereby these contacts remained closed until the end of a predetermined time interval for which the clock has been set.

Previous reference has been made to the interlock winding 36, and to the cooperating switches 144 and 163. A latch 188 is associated with winding 36 and is operated when the winding is energized. The switches 144 and 163 correspond to switches 83 and 86, disclosed in co-pending application Serial No. 163,392 entitled Centrifuge apparatus, in the name of E. G. Pickels and filed of even date herewith. Latch 188 corresponds to the lockout latch 91 of the same application. As described in said co-pending application, switches 144 and 163 are operated by a movable lock bar which serves to lock the cover of a vacuum chamber. This vacuum chamber serves to house the centrifuge rotor. Switches 144 and 163 are operated to close the same when the cover of the vacuum chamber is closed and locked. Latch 188 locks out a manually operated member which serves to operate the door locking bar and the switches 144 and 163. Thus during a normal run, the manually operated member just mentioned cannot be returned to start position until after winding 36 has been energized to release the lockout latch 188. Winding 36 is not energized until the rotor speed, after a normal run, has dropped down to a value of say below 5,000 R. P. M. When this occurs, energizing of winding 123 connects switch arm R3 with contact R1 thereby applying current to the winding 36 to release the latch 188. Thereafter the manually operated member for unlocking the vacuum chamber cover can be moved to release position, with opening of the switches 144 and 163.

As disclosed in copending application, Serial No. 160,888 filed May 9, 1950, in the name of E. G. Pickels and entitled "Centrifuge apparatus" it is desirable to provide overspeed safety means cooperating directly with the centrifuge rotor, and which serves to stop the driving motor in the event the rotor speed exceeds that for which the system is set by a predetermined amount. This means makes use of a knockout pin or wire 191 which is adapted to be disrupted by a pin mounted upon the centrifuge rotor. Normally the rotor pin is retained in retracted position by an additional shear pin. However when the speed exceeds a given safe value, the shear pin is severed whereby the rotor pin projects a limited amount to strike the knockout pin or wire 191. One terminal of the wire 191 is connected by wire 192 with the connector strip 64 and the center current supply conductor L₀. The other side is connected by wire 193, to the motor switch 17, where it makes connection with the movable contact 9. Thus the main current connection to the center line conductor L₀ is through the knockout pin 191. When this pin is broken the current supply to the motor is interrupted and the motor is brought to rest.

The operation of the complete system described above is as follows:

Assuming that one desires to make a run and that the circuit breakers 13, 14, 15 and 16 are closed, the clock control switch 44 is set for the time period of run desired. Contacts 141 and 151 of the speed control means 26 are set according to the speed desired. Resistor 71 is set according to the rate of acceleration desired. The operator closes the cover of the vacuum chamber which encloses the centrifuge rotor, and operates the locking means to locked position, whereby the switches 144 and 163 are closed. The closing of switch 163 starts the vacuum pump 156 in operation. Closing of switch 144 conditions the speed control 26 so that this control is effective for controlling the higher operating speeds under conditions of vacuum. When a suitable vacuum has been reached, switch 167 is closed to operate the pilot lights. The operator now starts a run by temporarily closing the starting button 187. This serves to close the contacts CS1 and CS2 of the clock control switch 44, and this in turn energizes the winding 46 of the motor switch 17, whereby the contacts of this switch are conditioned to start the motor turn in operation. The motor is now accelerated to running speed. During acceleration the thyratrons 19 and 21 are controlled by voltage supplied from the amplifier tube 22, and the control grid of this tube is in turn receiving the relatively large voltage difference between the voltage supplied by the rate generator, and that of the voltage divider. In other words, assuming that the motor speed is set for a rotor speed of 20,000 R. P. M., when the instantaneous speed is, say 2,000 R. P. M., the voltage from the voltage divider greatly exceeds the opposed voltage of the rate generator, and this voltage difference is applied to the control grid of the tube 22. Thus for the lower speeds through which the motor is being accelerated, the winding 54 of the saturable reactor is receiving a relatively heavy current from the thyratron rectifier, whereby it offers relatively low impedance in the motor circuit. As the motor reaches the speed for which the speed controller is set, a state of near balance occurs between the voltage supplied by the rate generator and the opposing voltage of the voltage divider, whereby tube 22 controls the thyratron rectifier in such a fashion as to reduce the current flow through the winding 54 of the saturable reactor. At constant speed, the current through winding 54 is maintained at such a value that the reactor offers a reactance such as will maintain the motor speed constant.

If during a normal run the rate generator should develop an open circuit, uncontrolled overspeed is prevented by the resistors 80 and 94 (see Figure 2). These resistors under such conditions develop a bias upon the control grid 4 such that the plate to cathode impedance of tube 22 is increased to reduce rather than increase the motor speed.

If an overspeed should occur because of reasons other than an open rate generator circuit, the back electromotive force of the motor is applied to the rectifier 41, and the rectified component thus obtained, for a given setting of the voltage divider formed by resistors 146, 147, 148 and 149, develops a controlling voltage of such value on the control grid of tube 23 as to cause this tube to reduce the current flow through the winding 102 of relay switch 48, thereby causing this switch to open the energizing circuit for the winding 46 of the motor switch 17. Thus, the motor is automatically brought to rest. The overspeed safety control also functions in the event that the commutator brushes become excessively worn, with resulting commutator sparking. This creates a condition equivalent to an overspeed with the result that relay switch 48 is automatically opened to stop the motor. At the end of the run the clock control switch 44 opens its contacts CS1 and CS2, and this serves to open the winding of the energizing circuit for the winding 49 of the motor switch 17, thus causing the contacts of this switch to move to reverse position. The motor is thus rapidly decelerated until its speed falls below a predetermined value. When the speed falls below the value just mentioned, the voltage applied by the rate generator to the control grid of tube 24 is such that this current no longer supplies holding current to the winding 123 of the relay switch 32, whereby contacts R2 and R3 are closed and contacts R1 and R3 are open. This serves to open the braking circuit of the motor, and at the same time to energize the winding 36 of the interlock, thus permitting the operator to move the manual means previously mentioned back to starting position to thereby open the switches 144 and 163.

It will be evident from the foregoing that I have provided motor control apparatus which is well adapted for use with centrifuge equipment, or which can be used in other applications where it is desired to provide automatic speed control for an electric driving motor. My apparatus provides automatic control over the speed, as well as control over acceleration and braking at the end of a run. Factors of safety are incorporated in the apparatus which prevents injury in the event of abnormal conditions, such as an open rate generator circuit, or some other abnormal condition tending to cause overspeed of the motor. The apparatus can be built into a relatively compact unit, particularly because of the use of thyratrons controlling the saturable reactor, and because of the manner in which the thyratrons are controlled to secure the results desired.

I claim:

1. In speed control apparatus for controlling the speed of an alternating current motor, a saturable core reactor having terminals connected to control supply of alternating current to the motor and to thereby control the motor speed, said reactor having a winding to which current can be supplied to vary the effective reactance between said terminals, a reactor of the thyratron type serving to supply the current to said winding, said rectifier being adapted to receive a controlling voltage to vary the output of the same, a resistance bridge, means for supplying current to two points on said bridge, a vacuum tube amplifier including plate, control grid and cathode elements and connected whereby its plate to cathode impedance forms one branch of said bridge, the voltage difference across two other points on said bridge varying depending upon the controlling voltage applied to the control grid of said amplifier tube, means coupling said two other points to the thyratron to apply controlling voltage to the latter, and means for applying controlling voltage to the control grid of said amplifier tube, said last means comprising a voltage divider adapted to be adjusted manually, means for applying direct current potential to the terminals of said voltage divider, a rate generator driven by the motor and serving to provide a voltage difference between its terminals which varies in accordance with the speed of operation of the motor, and circuit means forming connections between the terminals of said rate generator, the voltage divider and the control grid of said amplifier tube, whereby the effective voltage applied to said control grid is determined by the difference between the voltage between the terminals of the rate generator and the voltage supplied by the voltage divider.

2. The apparatus as in claim 1 together with a biasing resistor connected between the grid and cathode of said amplifier tube and serving to supply voltage to the grid of said amplifier tube in the event the rate generator should be open circuited, to thereby prevent overspeed of the motor under such conditions.

3. In speed control apparatus for controlling the speed of operation of an alternating current motor, a saturable core reactor having its terminals connected to control supply of current to the motor to thereby control the motor speed, said reactor having a winding to which a current can be applied to vary the effective reactance between said terminals, a rectifier of the thyratron type serving to supply current to said winding in accordance with the value of a controlling voltage supplied to the rectifier, means for applying controlling voltage to said rectifier in accordance with the speed of the motor to thereby maintain the speed constant, an amplifier tube including plate, control grid and cathode elements, circuit means for starting and stopping the motor, connections from said tube to said circuit means for controlling the latter, another rectifier means connected to the motor and serving to receive back electromotive force under abnormal motor overspeed conditions, and means for applying voltage developed by the rectified component of said last named rectifier means to the control grid of said amplifier tube, the controlling voltage thus applied serving to prevent abnormal overspeed conditions of the motor.

4. In speed control apparatus for controlling the speed of operation of an alternating current motor, a saturable core reactor having terminals connected to control supply of alternating current to the motor to thereby control the motor speed, the said reactor having a winding to which current can be applied to vary the effective reactance between said terminals, a rectifier of the thyratron type serving to control current supplied to said winding, the output of said rectifier being dependent upon the value of a controlling voltage applied to the same, a vacuum tube amplifier having plate, control grid and cathode elements, means serving to connect the plate and cathode of said amplifier tube to said rectifier whereby controlling voltage is applied to the rectifier depending upon the value of voltage applied to the control grid of the amplifier tube, means including a rate generator driven by the motor and serving to apply controlling voltage to the grid of said amplifier tube, another rectifier connected to the motor and adapted to receive current developed by back electromotive force developed in the motor under conditions of abnormal overspeed, a motor switch for controlling supply of current to the motor and having two operating positions, one corresponding to normal operation of the motor and the other corresponding to braking position to decelerate the motor, a winding serving to operate said motor switch, a relay switch serving to control the circuit for said winding, and means controlled by the output of the rectifier for energizing said last named winding.

5. In speed control apparatus for controlling the speed of an alternating current motor, a saturable core reactor having terminals connected to control supply of alternating current to the motor to thereby control the motor speed, said reactor having a winding to which current can be applied to vary the effective reactance between said terminals, a rectifier of the thyratron type serving to control current supplied to said winding to thereby control the motor speed, said rectifier being adapted to receive a controlling voltage to vary the rectified output of the same, means including a rate generator driven by the motor and serving to apply controlling voltage to the rectifier to maintain the motor speed constant, a switch connected in the motor current supply circuit and having two operating positions, one of which corresponds to normal running operation of the motor, and the other being a reversing position for braking the motor, means including a winding for operating said motor switch, a clock controlled switch having circuit connections to said winding to cause movement of said switch to reversing position at the end of a predetermined time interval, a vacuum amplifier tube having plate, control grid and cathode elements, a relay switch controlled by the plate to cathode impedance of said tube and serving to control the circuit of the motor when said motor switch is in said motor braking position, and means forming an electrical connection from the control grid of said amplifier tube to said rate generator whereby when the speed of operation of the motor falls below a predetermined value, said motor switch is moved from reverse to normal position to interrupt further braking of the motor.

6. In speed control apparatus for controlling the speed of operation of an alternating current motor, a saturable core reactor having terminals connected to control supply of alternating current to the motor to thereby control the motor speed, said reactor having a winding to which current can be supplied to vary the effective reactance between said terminals, a rectifier of the thyratron type serving to supply current to said winding, said rectifier being adapted to receive a controlling voltage and serving to supply rectified output depending upon the value of said voltage, a rate generator connected to be driven by said motor and serving to supply a voltage depending upon the speed of operation of the motor, means including a vacuum tube amplifier for applying controlling voltage to the thyratron rectifier in accordance with the voltage supplied by the rate generator, a motor switch included in the energizing circuit for the motor and having two operating positions, the one normal position corresponding to normal operation of the motor and the second reversing position serving to brake the motor to decelerate the same, means including a winding and energizing circuit for said winding serving to control the positioning of said motor switch, a second rectifier connected to receive back electromotive force from the motor under conditions of abnormal overspeed, means including a second vacuum tube amplifier having plate, control grid and cathode elements, means serving to couple the control grid of the said second amplifier tube to said last named rectifier, a relay switch controlled by the plate to cathode impedance of said last named amplifier tube and serving to control the energizing circuit for the winding of said motor switch, a third vacuum tube amplifier having plate, control grid and cathode elements, means serving to couple the control grid of said last named amplifier tube to said rate generator, a clock controlled switch for controlling the energizing circuit for the winding of the motor switch and serving after a predetermined interval to condition said motor switch in reversing position, and a relay switch controlled by the plate to cathode impedance of said last named amplifier tube for likewise controlling the energizing circuit for the motor switch to condition the motor switch in normal position when the motor speed has dropped down to a predetermined value.

7. In speed control apparatus for controlling the speed of operation of a variable speed alternating current motor, a saturable core reactor having its terminals connected to control supply of current to the motor to thereby control the motor speed, said reactor having a winding to which a current can be applied to vary the effective reactance between said terminals, a rectifier of the thyratron type serving to supply current to said winding in accordance with the value of a controlling voltage supplied to the rectifier, means for applying controlling voltage to said rectifier in accordance with the speed of the motor to thereby maintain the speed constant, an amplifier tube including plate, control grid and cathode elements, circuit means for starting and stopping the motor, connections from said tube to said circuit means for controlling the latter, another rectifier means having its input terminals adapted to be connected across the terminals of the motor armature, and means for applying voltage developed by the rectified component of said last named rectifier means to the control grid of said amplifier tube.

PHILIP F. SCOFIELD.

REFERENCES CITED

The following references are of record in the file of this patent:

UNITED STATES PATENTS

| Number | Name | Date |
|---|---|---|
| 2,373,208 | Trucksess | Apr. 10, 1945 |
| 2,412,864 | Bowman et al. | Dec. 17, 1946 |
| 2,462,751 | Koehler | Feb. 22, 1949 |

FOREIGN PATENTS

| Number | Country | Date |
|---|---|---|
| 534,287 | Great Britain | Mar. 4, 1941 |